United States Patent
Yao et al.

(10) Patent No.: US 8,179,632 B2
(45) Date of Patent: May 15, 2012

(54) APPARATUS AND METHOD FOR REDUCING PARTICLE ACCUMULATION IN A HARD DISK DRIVE

(75) Inventors: Yi Zhao Yao, Singapore (SG); Shaoyong Liu, Singapore (SG); Masaki Ootsuka, Odawara (JP); Yuuichi Ootani, Kanagawa-ken (JP); Jirou Kaneko, Kanagawa-ken (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1073 days.

(21) Appl. No.: 11/599,235

(22) Filed: Nov. 13, 2006

(65) Prior Publication Data
US 2008/0112074 A1 May 15, 2008

(51) Int. Cl.
*G11B 33/14* (2006.01)

(52) U.S. Cl. .................................................. 360/97.02

(58) Field of Classification Search ............... 360/97.01, 360/97.02, 97.03, 98.01
See application file for complete search history.

(56) References Cited

U.S. PATENT DOCUMENTS

| | | | | | |
|---|---|---|---|---|---|
| 4,282,554 | A | * | 8/1981 | Ho et al. | 360/97.02 |
| 5,134,530 | A | * | 7/1992 | Hall | 360/97.03 |
| 6,449,119 | B1 | * | 9/2002 | Hashizume et al. | 360/97.03 |
| 6,545,842 | B2 | * | 4/2003 | Rao et al. | 360/97.02 |
| 6,549,365 | B1 | * | 4/2003 | Severson | 360/97.02 |
| 6,624,966 | B1 | * | 9/2003 | Ou-Yang et al. | 360/97.02 |
| 6,882,501 | B2 | * | 4/2005 | Machcha et al. | 360/97.03 |
| 6,898,048 | B2 | * | 5/2005 | Adams et al. | 360/97.02 |
| 6,903,899 | B2 | * | 6/2005 | Sakata et al. | 360/97.03 |
| 7,830,636 | B2 | * | 11/2010 | Ang et al. | 360/97.02 |
| 7,944,644 | B2 | * | 5/2011 | Kaneko et al. | 360/97.02 |
| 2002/0196581 | A1 | * | 12/2002 | Tsang et al. | 360/97.02 |
| 2006/0028761 | A1 | * | 2/2006 | Zuo et al. | 360/97.02 |

* cited by examiner

*Primary Examiner* — Craig A. Renner

(57) ABSTRACT

A disk drive spoiler for reducing particle accumulation in a hard disk drive is provided. The spoiler includes a body portion for directing airflow generated by a rotating disk, the rotating disk comprising a middle diameter and an outer diameter wherein the body portion directs airflow away from the outer diameter of the disk. The spoiler also includes an end portion for directing airflow away from the middle diameter of the disk towards the outer diameter of the disk wherein the body portion comprises a substantially similar width between the middle diameter and the outer diameter.

9 Claims, 5 Drawing Sheets

500

Providing a body portion of a spoiler for directing airflow away from an outer diameter portion of a rotating disk
502

Providing an end portion of the spoiler for directing airflow away from the middle diameter portion of the disk towards the outer diameter portion of the disk
504

Wherein the body portion comprises a substantially similar width between the middle diameter portion and the outer diameter portion
506

FIG. 5

APPARATUS AND METHOD FOR REDUCING PARTICLE ACCUMULATION IN A HARD DISK DRIVE

TECHNICAL FIELD

The present invention relates to the field of hard disk drives, and more particularly to an apparatus and method for reducing particle accumulation in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk has resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow, the airflow will become turbulent as it passes the obstruction.

As is well known from fluid mechanics, the characteristics of turbulent airflow can include buffeting, harmonic vibration, and the like. Each of these characteristics will result in problematic motion for the arm and head portion and/or the rotating disk. The problematic motion will result in excessive track misregistration. This is even more significant as the tolerances are further reduced.

A second problem also occurs due to the increasingly tighter tolerances of the hard disk drive. For example, particle matter in the air can be detrimental to the operation of the hard disk drive. That is, since the head portion of the hard disk drive is located so close to the disk, even the slightest particle in the air can cause the head portion to destructively interact with the track it is reading from or writing to. Furthermore, particles can accumulate on disk drive components, reducing performance and potentially damaging the disk drive.

SUMMARY

A disk drive spoiler for reducing particle accumulation in a hard disk drive is provided. The spoiler includes a body portion for directing airflow generated by a rotating disk, the rotating disk comprising a middle diameter and an outer diameter wherein the body portion directs airflow away from the outer diameter of the disk. The spoiler also includes an end portion for directing airflow away from the middle diameter of the disk towards the outer diameter of the disk wherein the body portion comprises a substantially similar width between the middle diameter and the outer diameter.

BRIEF DESCRIPTION OF THE DRAWINGS

FIG. 5 is a flow diagram of an exemplary method for reducing particle accumulation in a hard disk drive in accordance with embodiments of the present invention.

BEST MODES FOR CARRYING OUT THE INVENTION

Reference will now be made in detail to the alternative embodiment(s)s of the present invention, an apparatus and method for reducing particle accumulation in a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
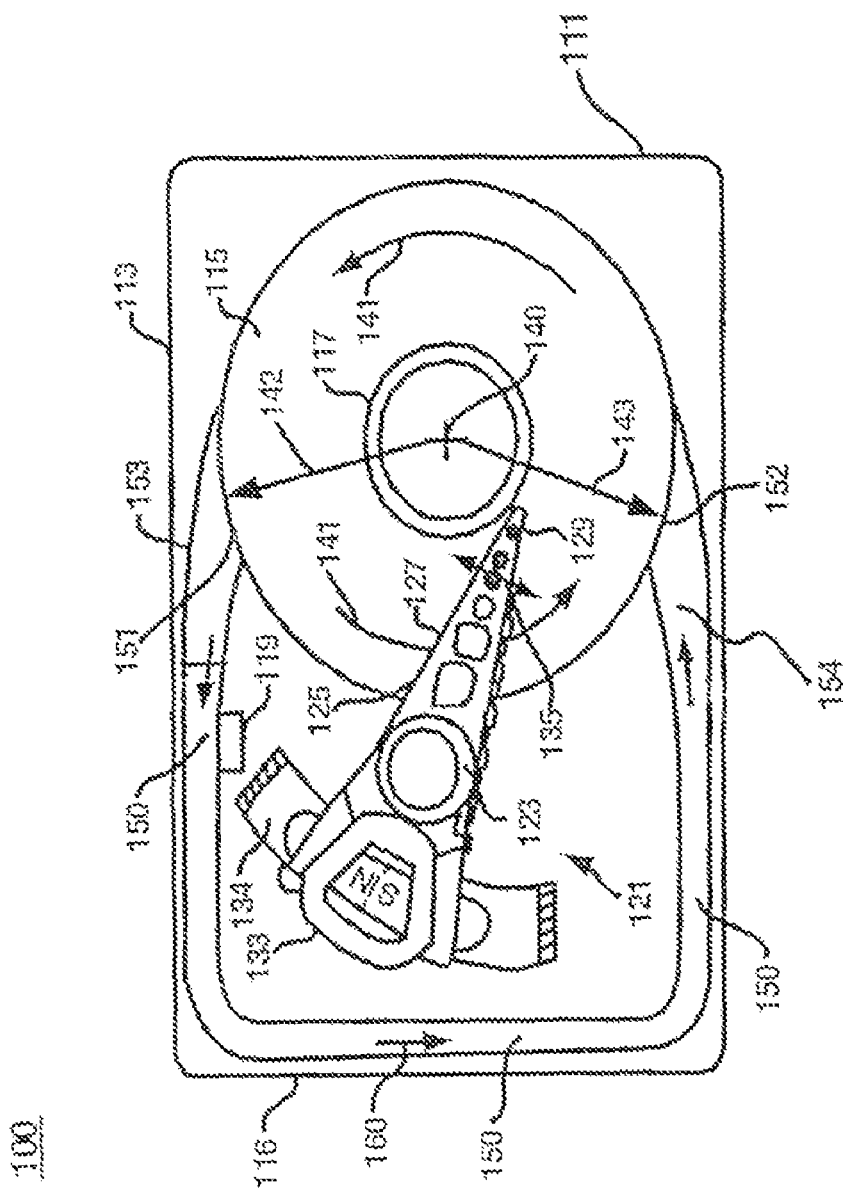
FIG. 1 is a schematic, top plan view of a hard disk drive in accordance with one embodiment of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is head and the slider 129, which are mounted on suspension 127. The slider 129 is usually bonded to the end of suspension 127. The head is typically pico size (approximately 1160×1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1).

In one embodiment the drive 111 also comprises a diffuser (not shown). In the embodiment shown, the diffuser (not shown). is located in a bypass channel and is positioned adjacent to the downstream side of the disk pack or disks 115. The diffuser (not shown) is also offset downstream from the disks 115 in the radial direction, such that the diffuser reduces airflow drag from the disks 115 due to disk wake in the bypass channel. This type of aerodynamic drag is commonly called base drag.

In the embodiment shown, the bypass channel 150 is located between an outer perimeter 116 of the housing 113 and the actuator 121, such that the bypass channel 150 completely circumscribes the actuator 121. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 constructed in accordance with the present invention also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag. In embodiments of the present invention, bypass channel 150 exhibits low flow resistance to airflow 160.

Alternatively, or operating in conjunction with the diffuser 153, another embodiment of the drive 111 may include a contraction 154 (e.g., a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

The use of bypass channel 150 has several advantages, including the ability to reduce aerodynamic buffeting of actuator 121 during the servo writing process and/or during normal operation of disk drive system 111. More specifically, bypass channel 150 reduces the pressure build-up on the upstream side of actuator 121 which occurs when drive 111 is operated. Additionally, directing airflow 160 around the actuator 121 decreases the upstream pressure on the actuator, thus reducing force acting on the actuator 121 while reducing the energy of the bluff-body wake of the actuator arm.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

Spoiler for Reducing Particle Accumulation

Embodiments of the present invention improve the shape of a disk drive spoiler, including the cross-sectional shape to reduce particle accumulation and adhesion onto the disks of a hard disk drive. In one embodiment of the invention, the width of the spoiler is relatively narrow and has a portion of substantially the same width. In particular, the portion of the spoiler from the outer diameter of the disk to the middle diameter of the disk has approximately the same width to reduce the area of lower pressure near the spoiler. The lower pressure region caused by the fast movement of air through the narrow gaps between the spoiler and the disk surface sucks particles into that region causing particle accumulation on the disks. The present invention reduces the low pressure area thus reducing particle accumulation.

It is appreciated that a disk drive without a spoiler will accumulate less particles than a disk drive with a spoiler. However, the disk drive without the spoiler will have increased air turbulence in the drive. Embodiments of the present invention improve airflow characteristics inside the disk drive while simultaneously reducing particle accumulation commonly associated with spoilers in a disk drive.

The advantage of using narrow and similar circumferential width of the spoiler, and the improvement of shapes minimize the area of lower pressure above and below the spoiler which reduces particle accumulation and adhesion onto the disk surfaces, especially the middle of the disk surface and the outer diameter of the disk where particles accumulate more with conventional spoilers.

Figure 2:
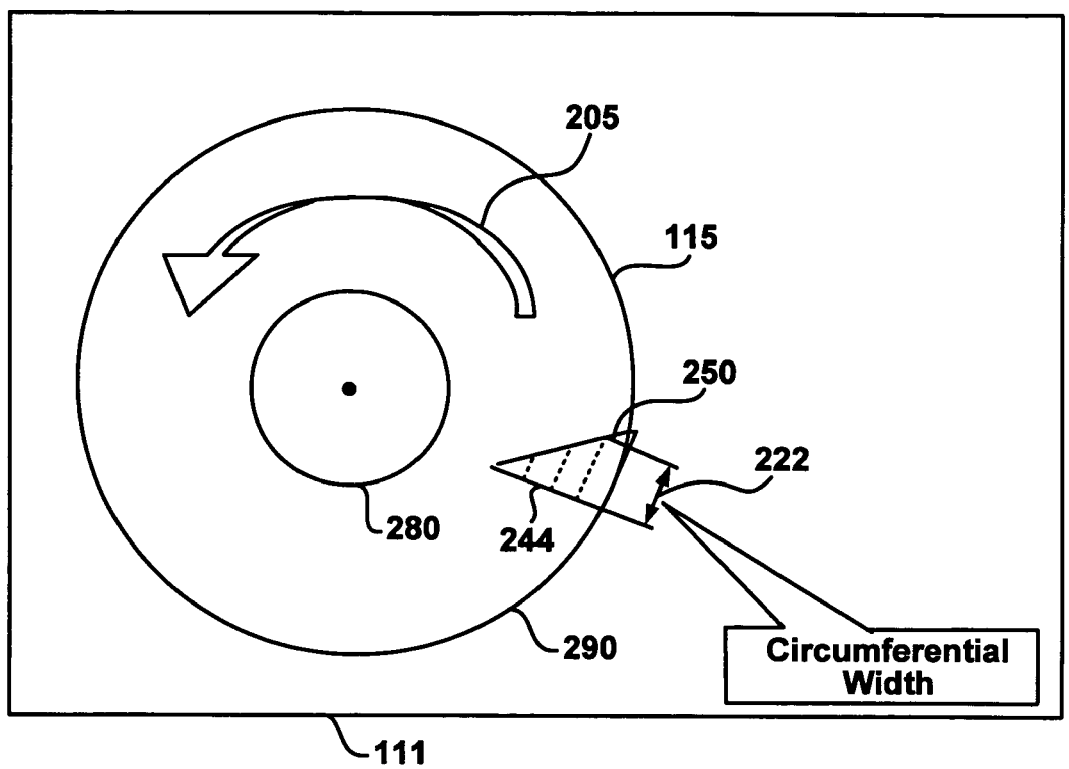
FIG. 2 is a diagram of an exemplary disk drive disk and a spoiler in accordance with embodiments of the present invention.

FIG. 2 is a diagram 200 of an exemplary disk drive disk 115 and a spoiler 250 for reducing particle accumulation in accordance with embodiments of the present invention. In one embodiment of the invention, the spoiler 250 comprises a similar circumferential width 222 from a middle diameter 280 to an outer diameter 290 of a disk 115. It is appreciated that FIG. 2 is an exaggerated view wherein the spoiler does not go all of the way from the outer diameter 290 to the middle diameter 280. The circumferential width 222 of the spoiler 250 increases from the middle diameter to the outer diameter for illustrative purposes. In one embodiment of the invention, the airflow generated by the rotation 205 of the disk 115 passes on leading edge 244.

The terms "middle diameter" and "outer diameter" are intended to be for illustrative purposes only. The term middle diameter referrers to a portion of the disk that is inside of the outer diameter of the disk with respect to the middle of the disk. Embodiments of the present invention include a spoiler with a body segment that has approximately the same width to decrease particle accumulation of the disk surface. In one embodiment of the invention, the spoiler has approximately the same width from a middle diameter portion of the disk to an outer diameter of the disk.

Figure 3:
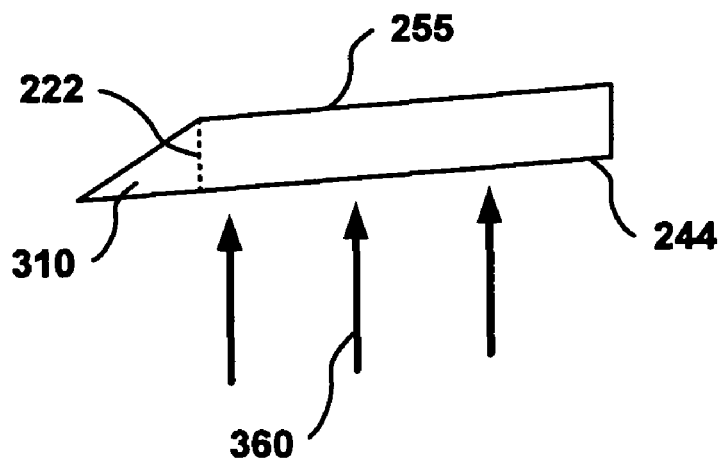
FIG. 3 is an illustration of a top view of an exemplary spoiler in accordance with embodiments of the present invention.

FIG. 3 is an illustration of a top view of an exemplary spoiler 250 in accordance with embodiments of the present invention. Spoiler 250 comprises an end portion 310 and a body portion 255. The end portion 310 may have a contoured shape (e.g., triangle shape) wherein the circumferential width is smaller towards the middle diameter than towards the body portion 255 of the spoiler 250 and a tip of the triangle shape is facing towards the middle of the disk. The airflow 360 hits the leading edge 244 of the spoiler and then passes the trailing edge 255. In one embodiment of the invention, the body portion comprises substantially the same circumferential width 222. In one embodiment of the invention, the width of the body portion is less than 15 mm. In another embodiment of the invention, the width of the body portion is between 2 and 10 mm.

Figure 4:
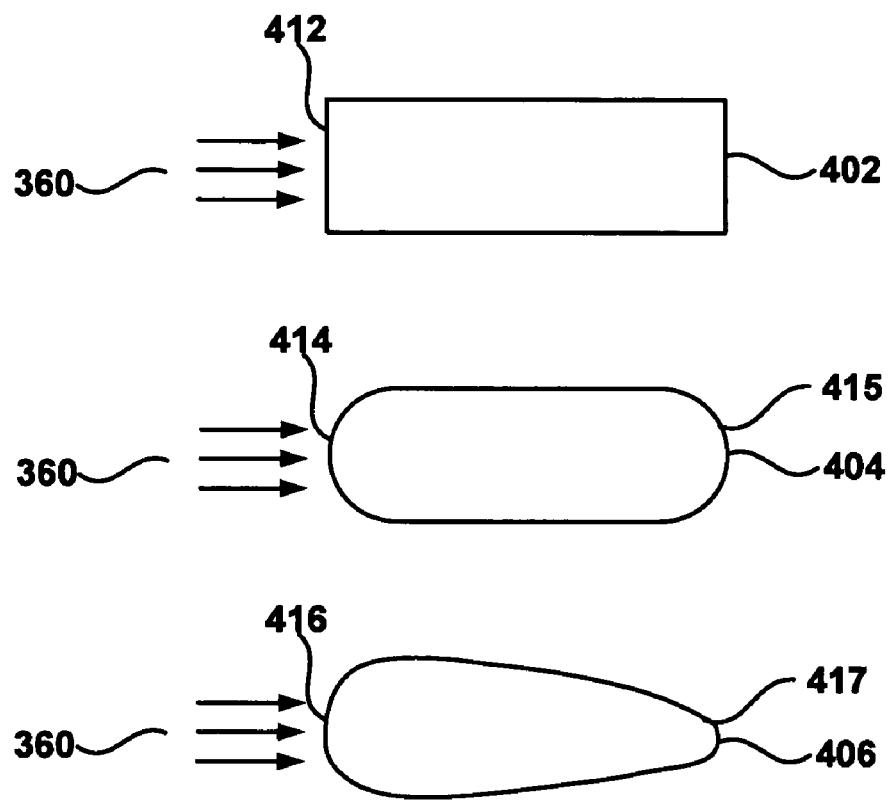
FIG. 4 is an illustration of a plurality of side view profiles of an exemplary spoiler in accordance with embodiments of the present invention.

FIG. 4 is an illustration of a plurality of side view profiles of an exemplary spoiler in accordance with embodiments of the present invention. In one embodiment of the invention, the side profile of the spoiler comprises approximately square edges 402. In this embodiment of the invention, the airflow 360 hits a relatively flat leading edge 412.

In another embodiment of the invention, the side profile of the spoiler is rounded 404. In this embodiment of the invention, the leading edge 414 of the spoiler is rounded and the trailing edge 415 of the spoiler is rounded.

An aerodynamic profile 406 comprises a rounded leading edge 416 and a rounded trailing edge 417. In this embodiment of the invention, the thickness of the leading edge 416 is greater than the trailing edge 417.

FIG. 5 is a flow diagram of an exemplary method 500 for reducing particle accumulation in a hard disk drive in accordance with embodiments of the present invention.

At step 502, method 500 includes providing a body portion of a spoiler for directing airflow away from an outer diameter portion of a rotating disk.

At step 504, method 500 includes providing an end portion of the spoiler for directing airflow away from a middle diameter portion of the disk towards the outer diameter portion of the disk.

At 506, method 500 includes wherein the body portion comprises a substantially similar width between the middle diameter portion and the outer diameter portion.

The alternative embodiment(s) of the present invention, a method and system for guiding bypass reentry flow through contraction and filter for a hard disk drive, is thus described. While the present invention has been described in particular embodiments, it should be appreciated that the present invention should not be construed as limited by such embodiments, but rather construed according to the below claims.

What is claimed is:

1. A disk drive spoiler comprising:
a body portion for directing airflow generated by a rotating disk, said rotating disk comprising a middle diameter and an outer diameter wherein said body portion directs airflow away from said outer diameter of said disk, said body portion including a straight leading edge that is parallel to a trailing edge, wherein said leading edge is thicker than said trailing edge, wherein a portion of said leading edge is rounded and a portion of said trailing edge is rounded;
an end portion for directing airflow away from said middle diameter of said disk towards said outer diameter of said disk; and
wherein said body portion comprises a substantially similar width between said middle diameter and said outer diameter of said disk.

2. The disk drive spoiler as described in claim 1 wherein said substantially similar width between said middle diameter and said outer diameter of said disk reduces particle accumulation on said disk and said spoiler.

3. The disk drive spoiler as described in claim 1 wherein said end portion is a triangle shape wherein a point of said triangle shape is closest to said middle diameter of said disk.

4. A hard disk drive comprising:
a housing;
a disk pack mounted to the housing and having a plurality of disks that are rotatable relative to the housing, the disk pack defining an axis of rotation and a radial direction relative to the axis, said disks comprising a middle diameter and an outer diameter;
an actuator mounted to the housing and being movable relative to the disk pack, the actuator having a plurality of heads for reading data from and writing data to the disks; and
a plurality of spoilers, at least one spoiler comprising:

a body portion for directing airflow generated by rotating said disks, wherein said body portion directs airflow away from said outer diameter of said disks; said body portion including a linear leading edge that is parallel to a trailing edge, wherein said leading edge is thicker than said trailing edge, wherein a portion of said leading edge and a portion of said trailing edge are rounded;

an end portion for directing airflow away from said middle diameter of said disks towards said outer diameter of said disks; and wherein said body portion comprises a substantially similar width between said middle diameter and said outer diameter of said disks.

5. The hard disk drive as described in claim 4 wherein said substantially similar width between said middle diameter and said outer diameter of said disks reduces particle accumulation on said plurality of disks and said spoiler.

6. The hard disk drive as described in claim 4 wherein said end portion is a triangle shape wherein a point of said triangle shape is closest to said middle diameter of one of said plurality of disks.

7. A method for reducing particle contamination in a hard disk drive comprising:

providing a body portion of a spoiler for directing airflow away from an outer diameter portion of a rotating disk, said body portion including a leading edge that is parallel to a straight trailing edge, wherein said leading edge is thicker than said trailing edge, wherein a portion of said leading edge and a portion of said trailing edge are rounded;

providing an end portion of said spoiler for directing airflow away from a middle diameter portion of said disk towards said outer diameter portion of said disk; and wherein said body portion comprises a substantially similar width between said middle diameter portion and said outer diameter portion of said disk.

8. The method as described in claim 7 wherein said substantially similar width between said middle diameter portion and said outer diameter portion of said disk reduces particle accumulation on said disk and said spoiler.

9. The method as described in claim 7 wherein said end portion is a triangle shape wherein a point of said triangle shape is closest to said middle diameter portion of said disk.

* * * * *